3,416,723
GAS TURBINE ROTOR
Christian Schmitz, Engelberg, Post Schorndorf, and Walter Mathieu, Oberstenfeld, Germany, assignors to Daimler-Benz Aktiengesellschaft, Stuttgart-Unterturkheim, Germany
Filed Dec. 13, 1966, Ser. No. 601,408
Claims priority, application Germany, Dec. 16, 1965,
D 48,923
3 Claims. (Cl. 230—116)

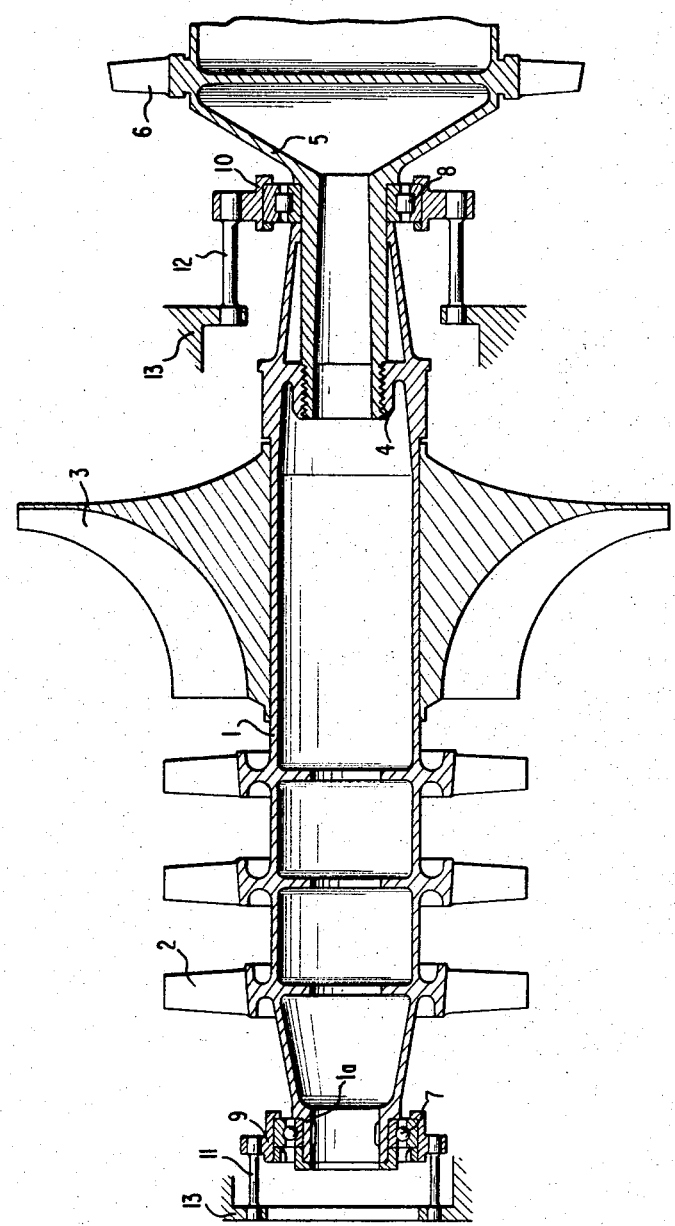

ABSTRACT OF THE DISCLOSURE

A bearing support for gas-turbine rotor provided with a compressor rotor and a turbine rotor and utilizing at least two bearings elastic in the radial direction of which one bearing is located in front of the compressor rotor and one bearing is located between the compressor rotor and the turbine rotor.

Background of the invention

The present invention relates to gas-turbine rotors, and more particularly to a bearing support for a gas-turbine rotor including a compressor rotor and a turbine rotor.

With the prior art gas turbines whose rotor parts consist of a compressor rotor and of a turbine rotor, it is common practice to arrange one bearing in front of the compressor rotor and one bearing to the rear of the turbine rotor.

However, such prior art arrangement entailed the disadvantage that one of the bearings was accommodated in the hot zone behind or downstream of the turbine which made necessary additional constructional expenditures, principally as regards the supply and discharge of a quantity of oil of appropriate temperature, and adequate for the lubrication and cooling of the bearing, and which was particularly disadvantageous as regards the length of life of the bearing.

It has already been proposed heretofore and belongs to the state of the art to suspend the bearings of the rotor of a gas turbine elastically in a radial direction. There is achieved by such a bearing support that during normal operation of the turbine, all movable parts rotate as close as possible about the axis passing through the common center of mass thereof so that the vibrations of a drive unit thus supported, is considerably reduced.

Summary of the invention

For purposes of avoiding the disadvantages of a bearing in the hot zone behind the turbine, it is proposed according to the present invention, with a rotor of a gas turbine elastically supported in the radial direction at two places, to arrange one bearing in front of the compressor rotor and one bearing between the compressor rotor and the turbine rotor so that the turbine rotor is supported in an overhung or floating manner.

Accordingly, it is an object of the present invention to provide a gas turbine rotor and bearing support therefor which avoids the aforementioned shortcomings and drawbacks encountered in the prior art by extremely simple means.

Another object of the present invention resides in a bearing support for a gas turbine rotor consisting of a compressor rotor and turbine rotor which eliminates the need for complicated and costly constructions to assure adequate quantities of lubricant of appropriate temperatures for each bearing.

A further object of the present invention resides in a gas turbine rotor and bearing support thereof which is so constructed and arranged as to assure a relatively longer length of life of each bearing, especially the turbine rotor bearing.

These and further objects, features, and advantages of the present invention will become more obvious from the following description, when taken in connection with the accompanying drawing which shows, for purposes of illustration only, one embodiment in accordance with the present invention, and wherein:

The single figure is a schematic longitudinal cross-sectional view of one embodiment of a gas turbine rotor in accordance with the present invention.

Referring now to the single figure of the drawing, the compressor rotor 1 which carries the blade 2 and a radial wheel 3 placed thereon, is connected with the drum-shaped turbine rotor 5 by means of a threaded connection at 4. The turbine rotor 5 is provided with blades 6. The rotor unit consisting of compressor rotor 1 and of turbine rotor 5 is supported in a bearing 7 arranged at the inlet side 1a of the compressor rotor 1 and in a second bearing 8 arranged between the compressor rotor 1 and the turbine rotor 5. The bearings 7 and 8 are retained in annularly shaped housings 9 and 10, respectively which are connected by way of bending rods 11 and 12 with the housing of the turbine schematically indicated at 13.

The arrangement of the bearing 8 according to the present invention within the relatively cool area between the compressor rotor 1 and the turbine rotor 5 requires no special expenditures for the lubrication and cooling of the bearing 8 and is effective favorably on its length of life.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A turbine-compressor unit, comprising: a relatively stationary housing; a drum-shaped compressor rotor; a drum-shaped turbine rotor drivingly connected to said compressor rotor; a first rotor bearing upstream of said compressor rotor, rotatably mounting the upstream end of said compressor rotor; a second rotor bearing between said compressor rotor and said tubine rotor rotatably supporting said drivingly connected rotors; said turbine rotor being cantilever mounted in the downstream direction by said compressor rotor and said second bearing being the only support for said turbine rotor; and means resiliently supporting each of said bearings for limited radial movement with respect to said housing.

2. The unit according to claim 1, wherein said resiliently supporting means includes a plurality of circumferentially spaced axially extending spring bending rods between said housing and respectively said bearings.

3. The unit according to claim 2, including a threaded interconnection between said compressor rotor and said turbine rotor, and an axially spaced cylindrical telescopically engaging guiding support between said rotors constituting the driving connection between said rotors.

References Cited

UNITED STATES PATENTS

| | | | |
|---|---|---|---|
| 2,465,099 | 3/1949 | Johnson | 230—116 |
| 2,616,662 | 11/1952 | Mierley | 253—39 |
| 2,643,078 | 6/1953 | Brown et al. | 253—39 |
| 2,682,991 | 7/1954 | Craig et al. | 230—116 |
| 2,721,445 | 10/1955 | Giliberty | 230—116 |
| 2,936,999 | 5/1960 | Coar et al. | 253—39 |
| 2,939,626 | 6/1960 | Birmann | 230—116 |
| 3,070,286 | 12/1962 | Weaving | 230—134.45 |

FOREIGN PATENTS 679,634  9/1952  Great Britain.

HENRY F. RADUAZO, *Primary Examiner.*

U.S. Cl. X.R.

230—134, 132